United States Patent
Zhao et al.

(10) Patent No.: US 10,719,154 B2
(45) Date of Patent: Jul. 21, 2020

(54) DISPLAY SUBSTRATE AND FABRICATION METHOD THEREOF, DISPLAY PANEL AND DISPLAY SYSTEM

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Na Zhao, Beijing (CN); Liyun Deng, Beijing (CN); Miao Yuan, Beijing (CN)

(73) Assignees: BOE TECHNOLOGY GROUP CO., LTD., Beijing (CN); HEFEI BOE OPTOELECTRONICS TECHNOLOGY CO., LTD, Hefei (CN)

(*) Notice: Subject to any disclaimer, the term of this patent is extended or adjusted under 35 U.S.C. 154(b) by 90 days.

(21) Appl. No.: 16/034,934

(22) Filed: Jul. 13, 2018

(65) Prior Publication Data

US 2019/0095017 A1    Mar. 28, 2019

(30) Foreign Application Priority Data

Sep. 22, 2017   (CN) .......................... 2017 1 0868960

(51) Int. Cl.
  *G06F 3/041*   (2006.01)
  *G06F 3/042*   (2006.01)
  *G06F 3/044*   (2006.01)
(52) U.S. Cl.
  CPC ............ *G06F 3/0412* (2013.01); *G06F 3/042* (2013.01); *G06F 3/0421* (2013.01); *G06F 3/044* (2013.01);

(Continued)

(58) Field of Classification Search
CPC ...... G06F 3/0412; G06F 3/042; G06F 3/0421; G06F 2203/04103
See application file for complete search history.

(56) References Cited

U.S. PATENT DOCUMENTS

| 8,692,212 B1* | 4/2014 | Craft ..................... G06F 3/0317 250/458.1 |
| 2004/0263670 A1* | 12/2004 | Yamasaki ............. G06F 3/0412 348/340 |

(Continued)

FOREIGN PATENT DOCUMENTS

| CN | 104009067 A | 8/2014 |
| CN | 106773163 A | 5/2017 |

(Continued)

OTHER PUBLICATIONS

The First Chinese Office Action dated Oct. 11, 2019; Appln. No. 201710868960.3.

*Primary Examiner* — Nitin Patel
*Assistant Examiner* — Robert M Stone

(57) ABSTRACT

A display substrate and a fabrication method thereof, a display panel and a display system are provided. The display substrate includes: a substrate, having a display region; and infrared light detectors, provided on a first surface of the substrate and located within the display region of the substrate. The infrared light detectors are configured to receive an infrared light signal irradiated onto the display substrate and convert the infrared light signal into a current signal; and an irradiation position of the infrared light signal on the display substrate is determined according to the current signal.

13 Claims, 5 Drawing Sheets

(52) U.S. Cl.
CPC .............. *G06F 2203/04103* (2013.01); *G06F 2203/04106* (2013.01)

(56) References Cited

U.S. PATENT DOCUMENTS

| | | | | |
|---|---|---|---|---|
| 2006/0145365 | A1* | 7/2006 | Halls | B82Y 10/00 347/238 |
| 2008/0074401 | A1* | 3/2008 | Chung | G02F 1/1368 345/175 |
| 2009/0027358 | A1* | 1/2009 | hosono | G06F 3/0421 345/175 |
| 2009/0231511 | A1* | 9/2009 | Takahashi | G02F 1/13338 349/61 |
| 2010/0308212 | A1* | 12/2010 | Tanaka | G01J 1/1626 250/214.1 |
| 2011/0037716 | A1* | 2/2011 | Lee | G06F 3/0412 345/173 |
| 2011/0096009 | A1* | 4/2011 | Kurokawa | G06F 3/0412 345/173 |
| 2011/0102413 | A1* | 5/2011 | Hamer | G09G 3/3233 345/213 |
| 2011/0109591 | A1* | 5/2011 | Kurokawa | G02F 1/13338 345/175 |
| 2011/0109592 | A1* | 5/2011 | Kurokawa | G06F 3/0412 345/175 |
| 2011/0156996 | A1* | 6/2011 | Izumi | G06F 3/0412 345/92 |
| 2011/0198484 | A1* | 8/2011 | Kurokawa | H01L 27/146 250/214 R |
| 2011/0205209 | A1* | 8/2011 | Kurokawa | G01J 1/18 345/211 |
| 2011/0221723 | A1* | 9/2011 | Kurokawa | G06F 3/042 345/207 |
| 2011/0221725 | A1* | 9/2011 | Murai | G06F 3/042 345/207 |
| 2011/0222011 | A1* | 9/2011 | Murai | G02F 1/13338 349/140 |
| 2012/0139866 | A1* | 6/2012 | Jung | G06F 3/0421 345/174 |
| 2012/0280904 | A1* | 11/2012 | Skurnik | G06F 3/0416 345/156 |
| 2014/0036168 | A1* | 2/2014 | Ludwig | G06F 3/0412 349/12 |
| 2017/0123542 | A1 | 5/2017 | Xie et al. | |
| 2017/0249520 | A1 | 8/2017 | Lee | |

FOREIGN PATENT DOCUMENTS

| | | |
|---|---|---|
| CN | 106783897 A | 5/2017 |
| CN | 107126219 A | 9/2017 |
| WO | 2015/005447 A1 | 1/2015 |

* cited by examiner

DISPLAY SUBSTRATE AND FABRICATION METHOD THEREOF, DISPLAY PANEL AND DISPLAY SYSTEM

The present application claims priority of Chinese Patent Application No. 201710868960.3 filed on Sep. 22, 2017, the disclosure of which is incorporated herein by reference in its entirety as part of the present application.

TECHNICAL FIELD

Embodiments of the present disclosure relate to a display substrate and a fabrication method thereof, a display panel and a display system.

BACKGROUND

At present, most of touch screens used in daily life are capacitive touch screens, and the capacitive touch screens are widely used by users due to their high sensitivity. The capacitive touch screen determines a position of a touch point in a mode of capacitive sensing, the user operates the touch screen by approaching or touching the capacitive touch screen, and thereby the user cannot operate the touch screen at a distance. In addition, touching the capacitive touch screen directly with a hand or a stylus may easily leave scratches on a surface of the touch screen, which, thus, is apt to reduce touch sensitivity and affects life of the touch screen.

SUMMARY

According to embodiments of the disclosure, a display substrate is provided. The display substrate comprises: a substrate, having a display region; and a plurality of infrared light detectors, provided on a first surface of the substrate and located within the display region of the substrate. The plurality of infrared light detectors are configured to receive an infrared light signal irradiated onto the display substrate and convert the infrared light signal into a current signal; and an irradiation position of the infrared light signal on the display substrate is determined according to the current signal.

For example, each of the plurality of infrared light detectors includes: a first electrode and a second electrode, provided on the substrate in a stack manner; and an infrared light detecting layer, provided between the first electrode and the second electrode.

For example, the plurality of infrared light detectors are arranged in a plurality of rows and a plurality of columns, the first electrodes in each column are electrically connected with each other through a first lead, and the second electrodes in each row are electrically connected with each other through a second lead; in a row direction, a width of the first lead is smaller than a width of the first electrode; and in a column direction, a width of the second lead is smaller than a width of the second electrode.

For example, the plurality of infrared light detectors are arranged in a plurality of rows and a plurality of columns, the first electrode extends in a column direction so that all infrared light detectors in each column share one first electrode, and the second electrode extends in a row direction so that all infrared light detectors in each row share one second electrode.

For example, the infrared light detecting layer includes a lead sulfide particle, and the lead sulfide particle has a size of 8 nm to 15 nm.

For example, the display substrate further comprises a thin film transistor, provided on the first surface of the substrate and located within the display region of the substrate. The first electrode and a gate electrode of the thin film transistor are made of a same material and provided in a same layer; and the second electrode and a source electrode and a drain electrode of the thin film transistor are made of a same material and provided in a same layer.

For example, the display substrate further comprises: a gate line and a data line provided within the display region of the substrate, and a pixel unit defined by the gate line and the data line intersecting with each other. The thin film transistor is located in the pixel unit, the gate electrode of the thin film transistor is connected with the gate line, and the source electrode of the thin film transistor is connected with the data line; an extension direction of the first electrode is the same as an extension direction of the gate line; and the first electrode, the gate electrode of the thin film transistor and the gate line are made of the same material and provided in the same layer; and an extension direction of the second electrode is the same as an extension direction of the data line; and the second electrode, the source electrode and the drain electrode of the thin film transistor and the data line are made of the same material and provided in the same layer.

For example, the display substrate further comprises a pixel electrode, connected with the drain electrode of the thin film transistor. In a direction perpendicular to the substrate, the pixel electrode does not overlap with the plurality of infrared light detectors.

For example, the display substrate further comprises a passivation layer, covering the plurality of infrared light detectors and the thin film transistor.

For example, in a direction perpendicular to an extension direction of the first electrode, a width of the infrared light detecting layer is larger than or equal to a width of the first electrode; and in a direction perpendicular to an extension direction of the second electrode, the width of the infrared light detecting layer is larger than or equal to a width of the second electrode.

According to the embodiments of the disclosure, a fabrication method of a display substrate is provided. The method comprises: providing a substrate, the substrate having a display region; and forming a plurality of infrared light detectors, the plurality of infrared light detectors being provided on a first surface of the substrate and located within the display region of the substrate. The plurality of infrared light detectors are configured to receive an infrared light signal irradiated onto the display substrate and convert the infrared light signal into a current signal; and an irradiation position of infrared light on the display substrate is determined according to the current signal.

For example, each of the plurality of infrared light detectors includes: a first electrode and a second electrode, provided on the substrate in a stack manner; and an infrared light detecting layer, provided between the first electrode and the second electrode.

For example, the method further comprises: forming a thin film transistor, the thin film transistor being provided on the first surface of the substrate and located within the display region of the substrate. The first electrode and a gate electrode of the thin film transistor are formed by using a single patterning process; and the second electrode and a source electrode and a drain electrode of the thin film transistor are formed by using a single patterning process.

For example, the method further comprises: forming a gate line and a data line within the display region of the substrate, the gate line and the data line intersecting with each other to define a pixel unit. The thin film transistor is located in the pixel unit, the gate electrode of the thin film transistor is connected with the gate line, and the source electrode of the thin film transistor is connected with the data line; an extension direction of the first electrode is the same as an extension direction of the gate line; and the first electrode, the gate electrode of the thin film transistor and the gate line are formed by using the single patterning process; and an extension direction of the second electrode is the same as an extension direction of the data line; and the second electrode, the source electrode and the drain electrode of the thin film transistor and the data line are formed by using the single patterning process.

According to the embodiments of the disclosure, a display panel is provided. The display panel comprises the display substrate as described above.

For example, the first surface of the substrate is a surface facing a user viewing the display panel.

According to the embodiments of the disclosure, a display system is provided. The display system comprises: the display panel as described above; and a stylus that emits the infrared light signal.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not (imitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical terms or scientific terms here should be of general meaning as understood by those ordinarily skilled in the art. In the descriptions and claims of the present disclosure, expressions such as "first", "second" and the like do not denote any order, quantity, or importance, but rather are used for distinguishing different components. Similarly, expressions such as "one", "a/an" or "the" or the like do not denote quantitative limitation, but rather indicate there is at least one. Expressions such as "include" or "comprise" and the like denote that elements or objects appearing before the words of "include" or "comprise" cover the elements or the objects enumerated after the words of "include" or "comprise" or equivalents thereof, not exclusive of other elements or objects. Expressions such as "up", "down", "left", "right" and the like are only used for expressing relative positional relationship, the relative positional relationship may be correspondingly changed in the case that the absolute position of a described object is changed.

Embodiments of the present disclosure provides a display substrate. Hereinafter, the display substrate provided by the embodiments of the present disclosure will be described in detail with reference to FIGS. 1 to 5 and FIGS. 11 to 12.

Figure 11:
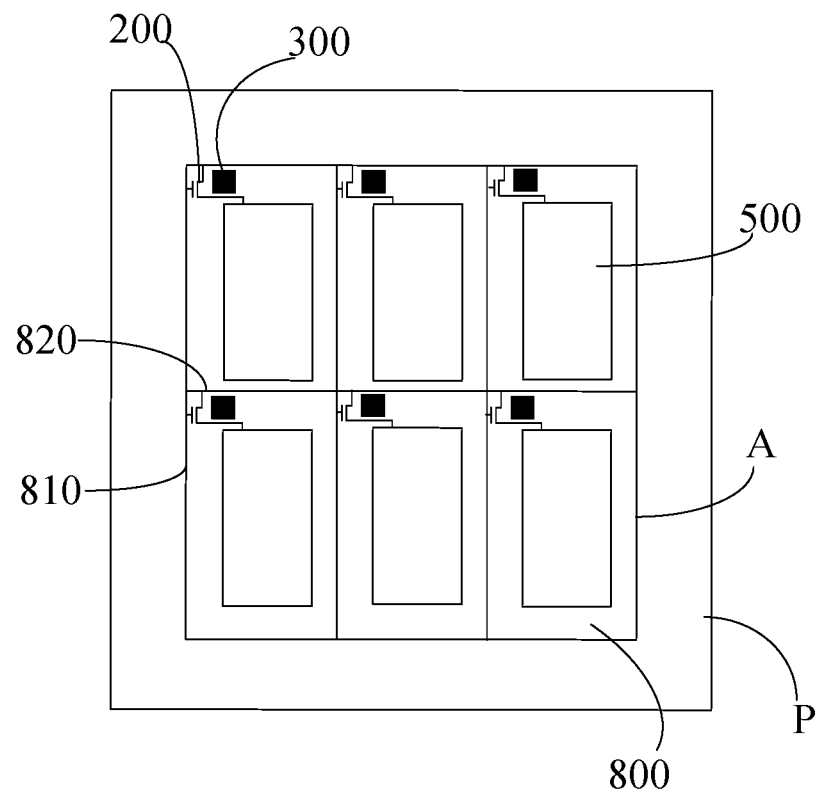
FIG. 11 is a top schematic view of the display substrate according to the embodiments of the present disclosure.

With reference to FIG. 11, the display substrate according to the embodiments of the present disclosure comprises: a substrate 100, having a display region A; and a plurality of infrared light detectors 300, provided on a first surface of the substrate 100 and located within the display region A of the substrate 100. The plurality of infrared light detectors 300 are configured to receive an infrared light signal irradiated onto the display substrate and convert the infrared light signal into a current signal, and an irradiation position of the infrared light signal on the display substrate is determined according to the current signal.

It should be noted that, the "first surface" of the substrate 100 refers to a surface facing a user during the display substrate is viewed, and "a plurality of" refers to two or more.

With reference to FIG. 11, the substrate 100 further has a peripheral region P, and the peripheral region P surrounds the display region A.

According to the embodiments of the disclosure, the infrared light detector 300 is provided on the display substrate, and is configured for receiving the infrared light signal remotely emitted by a stylus that is controlled by the user, and then the infrared light detector 300 converts the infrared light signal into the current signal, a position of the infrared light detector 300 which receives the infrared light signal is determined according to the current signal, so that the irradiation position of the infrared light signal on the display substrate is determined, and thus, a remote touch function (for example, a distance from the user to the display substrate is 1 meter to 5 meters) is implemented.

According to the embodiments of the present disclosure, a structure of the infrared light detector 300 will not be specifically limited. For example, each of the plurality of infrared light detectors 300 includes: a first electrode 310 and a second electrode 330, provided on the substrate 100 in a stack manner; and an infrared light detecting layer 320 provided between the first electrode 310 and the second electrode 330. For example, in a direction perpendicular to the substrate 100, the infrared light detecting layer 320 is provided between the first electrode 310 and the second electrode 330. For example, the first electrode 310 is provided between the substrate 100 and the second electrode 330, or the second electrode 330 is provided between the substrate 100 and the first electrode 310, which will be not limited in the embodiments of the present disclosure. For example, with reference to FIG. 1, the first electrode 310 is provided on the first surface of the substrate 100; the infrared light detecting layer 320 is provided on a side of the first electrode 310 facing away from the substrate 100; and the second electrode 330 is provided on a side of the infrared light detecting layer 320 facing away from the substrate 100. In this way, the first electrode 310 and the second electrode 330 respectively provided on a lower surface and an upper surface of the infrared light detecting layer 320 conduct the photocurrent signal converted from the infrared light signal by the infrared light detecting layer 320, so as to facilitate determining the irradiation position of the infrared light signal on the display substrate.

Figure 12:
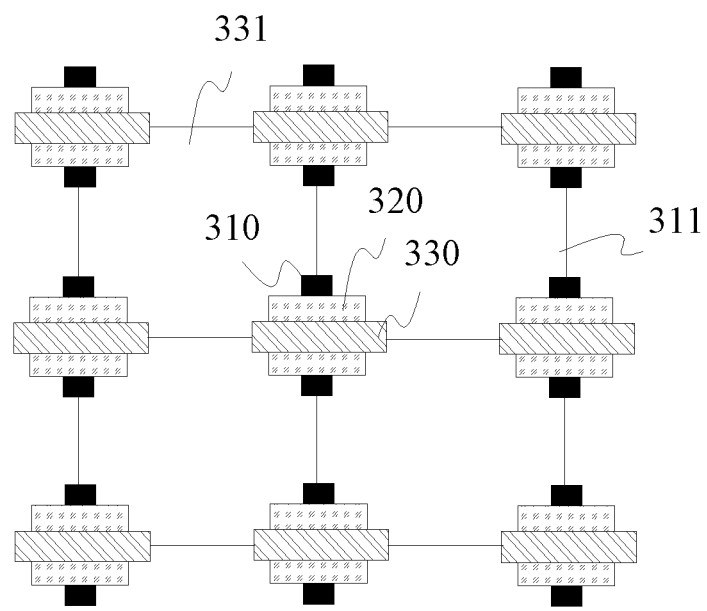
FIG. 12 is a top schematic view of a plurality of infrared light detectors according to the embodiments of the present disclosure.

According to the embodiments of the present disclosure, with reference to FIG. 12, the plurality of infrared light detectors 300 are arranged in a plurality of rows and a plurality of columns, the first electrodes 310 in each column are electrically connected with each other, and the second electrodes 330 in each row are electrically connected with each other. In this way, the first electrodes 310 in a same column are connected with each other in series to longitudinally conduct the photocurrent from the infrared light detecting layers 320 in the same column, and the second electrodes 330 in a same row are connected with each other in series to transversely conduct the photocurrent from the infrared light detecting layers 320 in the same row, so as to determine the irradiation position of the infrared light signal on the display substrate. In some embodiments of the present disclosure, with reference to FIG. 12, the first electrodes 310 in each column are electrically connected with each other through a first lead 311, and the second electrodes 330 in each row are electrically connected with each other through a second lead 331; in a row direction, a width of the first lead 311 is smaller than a width of the first electrode 310; and in a column direction, a width of the second lead 331 is smaller than a width of the second electrode 330. In this way, space on the display substrate is saved. It should be noted that, FIG. 12 is merely an explanation of the embodiments of the present disclosure, and does not limit the positional relationship between the first electrode 310, the second electrode 330 and the infrared light detecting layer 320, as long as the first electrode 310 and the second electrode 330 are respectively in contact with the infrared light detecting layer 320.

Figure 3:
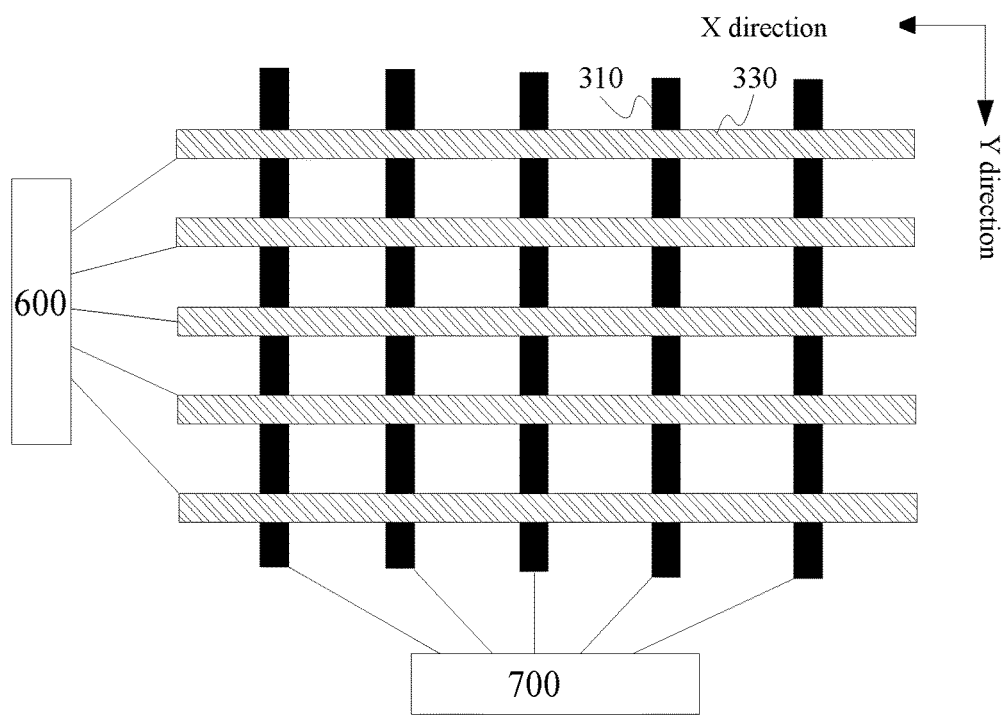
FIG. 3 is a top schematic view of an arrangement mode of a first electrode and a second electrode according to the embodiments of the present disclosure.

In other embodiments of the present disclosure, with reference to FIG. 3, the plurality of infrared light detectors 300 are arranged in the plurality of rows and the plurality of columns, the first electrode 310 extends in the column direction so that all infrared light detectors 300 in each column share one first electrode 310, and the second electrode 330 extends in the row direction so that all infrared light detectors 300 in each row share one second electrode 330. In this way, the first electrode 310 conducts the photocurrent from all infrared light detecting layers 320, with which the first electrode 310 is connected, in the same column, and the second electrode 330 conducts the photocurrent from all infrared light detecting layers 320, with which the second electrode 330 is connected, in the same row, so as to determine the irradiation position of the infrared light signal on the display substrate. For example, with reference to FIG. 3 again, the first electrode 310 is perpendicular to the second electrode 330 from a top view; the infrared light detecting layer 320 is provided at an intersection position of the first electrode 310 and the second electrode 330, and the position of the infrared light detecting layer 320 is determined according to the first electrode 310 and the second electrode 330 connected with the infrared light detecting layer 320.

For example, the infrared light detecting layer 320 at the irradiation position receives the infrared light signal, converts the infrared light signal into the photocurrent signal, and respectively conducts the photocurrent signal to the first electrode 310 and the second electrode 330 connected with the infrared light detecting layer 320; in this way, a second current signal receiver 600 connected with the second electrode 330 receives the current signal to determine a Y coordinate of the irradiation position; meanwhile, a first current signal receiver 700 connected with the first electrode 310 receive the current signal to determine an X coordinate of the irradiation position, so that the irradiation position of the infrared light signal on the display substrate is obtained, which is favorable for implementing infrared sensing control by the user remotely.

According to the embodiments of the present disclosure, a material of the infrared light detecting layer 320 is not limited, as long as the infrared light detecting layer 320 made of the material is able to effectively absorb the infrared light and convert the infrared light into the photocurrent. In some embodiments of the present disclosure, the infrared light detecting layer 320 is made of a lead sulfide (PbS) material. For example, the infrared light detecting layer 320 includes a lead sulfide particle, and the lead sulfide particle has a size of 8 nm to 15 nm; and in this case, the infrared light with a wavelength of 980 nm to 1400 nm is efficiently detected.

Lead sulfide (PbS) is an important direct narrow bandgap semiconductor material with a bandgap of about 0.4 eV at a room temperature and a relatively large Bohr exciton radius (~18 nm). These characteristics make PbS very sensitive to the infrared light; and PbS shows great advantages compared with a semiconductor quantum dot material prepared by using other solution method. The photoelectric detector device comprising an active layer made of the lead sulfide quantum dot is able to absorb light in a visible light band and an infrared light band, so that such photoelectric detector device has intensive response and high sensitivity. In particular, lead sulfide has very high sensitivity to the infrared light in the wavelength range from 980 nm to 1400 nm, and has a high photoelectric conversion rate the infrared light in the wavelength range from 980 nm to 1400 nm as well.

In some examples of the present disclosure, the size of the lead sulfide particle forming the infrared light detecting layer 320 is 8 nm, and in this case, the infrared light detecting layer 320 that is exceptionally sensitive to the infrared light having the wavelength of 1400 nm is obtained. In other examples of the present disclosure, the size of the lead sulfide particle forming the infrared light detecting layer 320 is 15 nm, and in this case, the infrared light detecting layer 320 that is exceptionally sensitive to the infrared light having the wavelength of 980 nm is obtained.

It should be noted that, the display substrate according to the embodiments of the present disclosure is an array substrate, or is an opposite substrate provided opposite to the array substrate. In a case where the display substrate is the array substrate, various circuit elements may be further provided on the display substrate.

Figure 1:
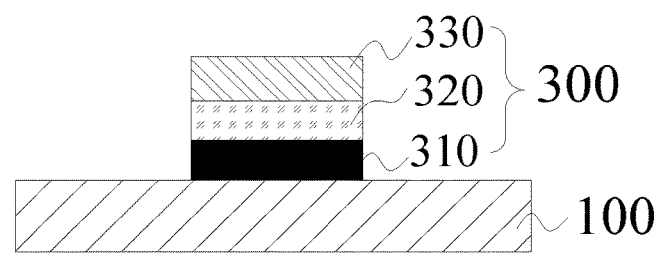
FIG. 1 is a cross-sectional structural schematic view of a display substrate according to embodiments of the present disclosure.
Figure 2:
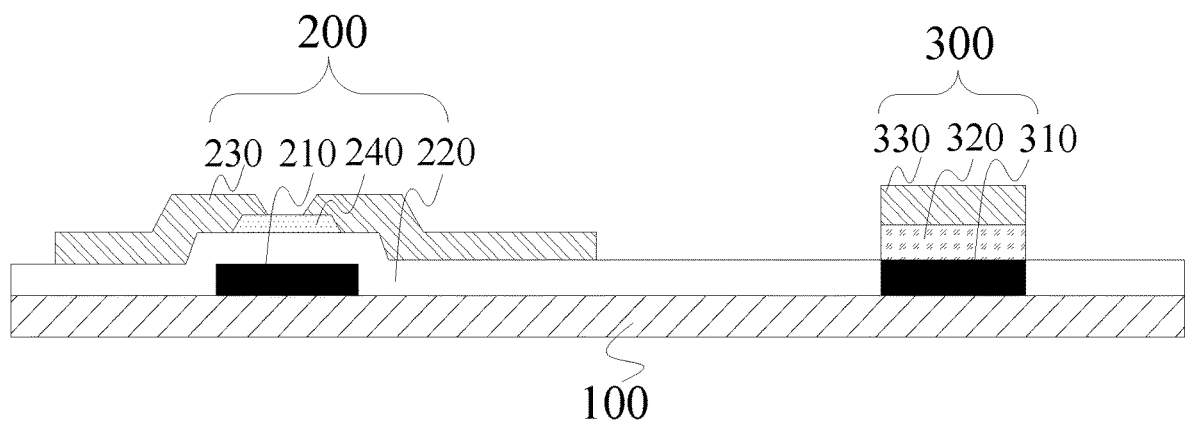
FIG. 2 is another cross-sectional structural schematic view of the display substrate according to the embodiments of the present disclosure.

According to the embodiments of the present disclosure, with reference to FIG. 2, the display substrate further comprises a thin film transistor (TFT) 200, provided on the first surface of the substrate 100 and located within the display region A of the substrate 100. The TFT 200 for example includes a gate electrode 210, a gate insulating layer 220, an active layer 240, and a source-drain electrode layer 230, and the source-drain electrode layer 230 includes a source electrode and a drain electrode. In this way, the infrared light detector 300 and the TFT 200 are provided on a same side of the display substrate, so that a thickness of the display substrate is not increased, which facilitates a design of a light and thin display panel including the display substrate.

According to the embodiments of the present disclosure, a material of the first electrode 310 and a material of the second electrode 330 are not limited, as long as the first electrode 310 and the second electrode 330 conduct the photocurrent converted by the infrared light detecting layer 320. In some embodiments of the present disclosure, the first electrode 310 and the gate electrode 210 are made of a same material and provided in a same layer, and the second electrode 330 and the source electrode and the drain electrode are made of a same material and provided in a same layer. In this way, the first electrode 310 and the gate electrode 210 are made of the same material, and the second electrode 330 and the source-drain electrode layer 230 are made of the same material, so as not to increase the thickness of the display substrate, and not to additionally increase steps and costs for fabricating the first electrode 310 and the second electrode 330.

According to the embodiments of the present disclosure, in conjunction with FIGS. 2 to 3 and FIGS. 11 to 12, the display substrate further comprises a gate line 810 and a data line 820 provided within the display region A of the substrate 100, and a pixel unit 800 defined by the gate line 810 and the data line 820 intersecting with each other; the thin film transistor 200 is located in the pixel unit 800, the gate electrode 210 of the thin film transistor 200 is connected with the gate line 810, the source electrode of the thin film transistor 200 is connected with the data line 820; an extension direction of the first electrode 310 is the same as an extension direction of the gate line 810, and the first electrode 310, the gate electrode 210 of the thin film transistor 200 and the gate line 810 are made of the same material and provided in the same layer; an extension direction of the second electrode 330 is the same as an extension direction of the data line 820, and the second electrode 330, the source electrode and the drain electrode of the thin film transistor 200 and the data line 820 are made of the same material and provided in the same layer. Therefore, steps and costs for fabricating the first electrode 310 and the second electrode 330 are not additionally increased, and it is favorable for a formation of a pixel electrode 500, and ensuring an aperture ratio.

According to the embodiments of the present disclosure, a width of the first electrode 310 and a width of the second electrode 330 are not limited. In some embodiments of the present disclosure, the width of the first electrode 310 is the same as a width of the gate line 810 provided in the same layer as the first electrode 310, and the width of the second electrode 330 is the same as a width of a data line 820 provided in the same layer as the second electrode 330, which, thus, effectively saves an electrode material while ensuring a photocurrent conduction speed.

According to the embodiments of the present disclosure, a cross-sectional area of the infrared light detecting layer 320 is not limited. In some embodiments of the present disclosure, a width of the infrared light detecting layer 320 in a direction perpendicular to an extension direction of the first electrode 310 is the same as the width of the first electrode 310, and a width of the infrared light detecting layer 320 in a direction perpendicular to an extension direction of the second electrode 330 is the same as the width of the second electrode 330, so that a projection of the infrared light detecting layer 320 on the substrate 100 coincides with a projection of an overlapped region of the first electrode 310 and the second electrode 330 on the substrate. In other embodiments of the present disclosure, the width of the infrared light detecting layer 320 in the direction perpendicular to the extension direction of the first electrode 310 is larger than the width of the first electrode 310, and the width of the infrared light detecting layer 320 in the direction perpendicular to the extension direction of the second electrode 330 is larger than the width of the second electrode 330, so that the infrared light detector 300 has a larger infrared light receiving area, which is favorable for increasing a probability of receiving the infrared light.

According to the embodiments of the present disclosure, distances between the plurality of infrared light detecting layers 320 are not limited. In some embodiments of the present disclosure, the distances between the plurality of infrared light detecting layers 320 are set so that each pixel unit has one infrared light detecting layer 320, and such arrangement renders higher recognition sensitivity. In some other embodiments of the present disclosure, the distances between the plurality of infrared light detecting layers 320 are set so that every two, three, four, or more pixel units have one infrared light detecting layer 320, and such arrangement also implements the recognition of the irradiation position.

According to the embodiments of the present disclosure, a distance between two adjacent first electrodes 310 and a distance between two adjacent second electrodes 330 are not limited. In some embodiments of the present disclosure, one pixel unit is provided between two adjacent first electrodes 310, and one pixel unit is provided between two adjacent second electrodes 330, and such arrangement renders higher recognition sensitivity.

According to the embodiments of the present disclosure, a thickness of the infrared light detecting layer 320 is not limited, as long as the infrared light detecting layer 320 with such thickness is able to effectively receive the infrared light signal and convert the infrared light signal into the photocurrent.

According to the embodiments of the present disclosure, a thickness of the first electrode 310 and a thickness of the second electrode 330 are not limited, as long as the first electrode 310 and the second electrode 330 are able to effectively conduct the photocurrent generated by the infrared light detecting layer 320. In some embodiments of the present disclosure, the thickness of the first electrode 310 is the same as a thickness of the gate electrode 210 provided in the same layer as the first electrode 310, and the thickness of the second electrode 330 is the same as a thickness of the source-drain electrode layer 230 provided in the same layer as the second electrode 330; in this way, a requirement for photocurrent conduction of the first electrode 310 and the second electrode 330 is satisfied without additionally increasing fabrication costs of the first electrode 310 and the second electrode 330.

Figure 4:
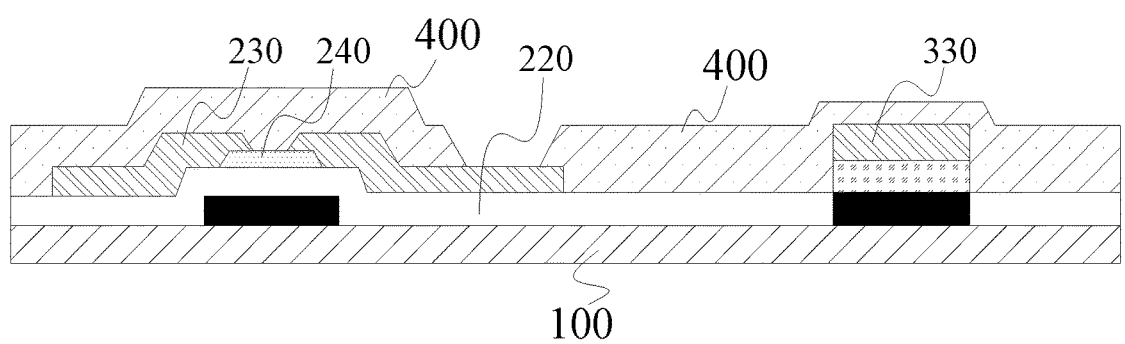
FIG. 4 is a further cross-sectional structural schematic view of the display substrate according to the embodiments of the present disclosure.

According to the embodiments of the present disclosure, with reference to FIG. 4, the display substrate for example further comprises a passivation layer 400, and the passivation layer 400 covers the source-drain electrode layer 230, the active layer 240 and the gate insulating layer 220 of the TFT 200, and the second electrode 330 of the infrared light detector 300. In this way, the passivation layer 400 not only effectively protects the TFT 200, but also protects the infrared light detector 300.

Figure 5:
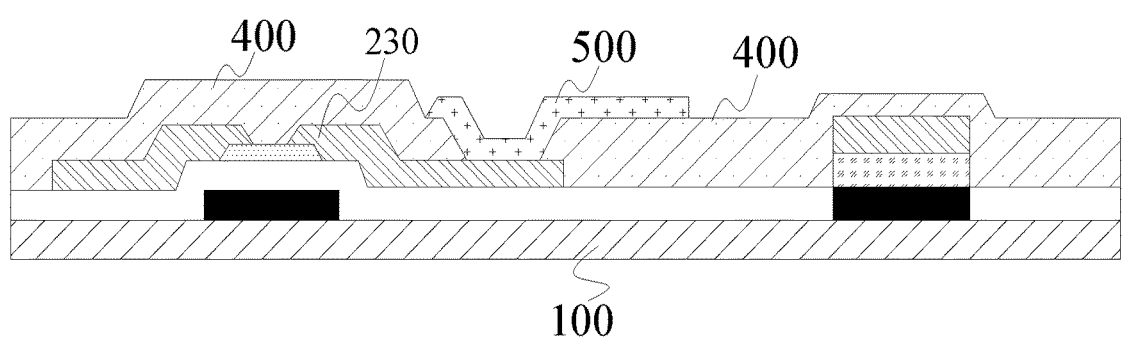
FIG. 5 is still another cross-sectional structural schematic view of the display substrate according to the embodiments of the present disclosure.

According to the embodiments of the present disclosure, with reference to FIG. 5, the display substrate for example further comprises the pixel electrode 500, and the pixel electrode 500 is connected with the drain electrode of the thin film transistor through a via hole provided in the passivation layer 400. In this way, a more complete display substrate is formed. For example, in the direction perpendicular to the substrate 100, the pixel electrode 500 does not overlap with the plurality of infrared light detectors 300, and in this way, the plurality of infrared light detectors 300 do not affect the display function of the display substrate. For example, a black matrix is provided between adjacent pixel electrodes 500, to completely shield the gate line 810, the data line 820, the thin film transistor 200 and the infrared light detector 300 between adjacent pixel electrodes 500, so as to ensure a display effect of the display substrate. The infrared light will not have a large loss upon it penetrates the black matrix, so even if the infrared light detector 300 is completely shielded by the black matrix, it is able to receive the infrared light as well. With reference to FIG. 11, the infrared light detector 300 is also provided at the intersection position of the gate line 810 and the data line 820, so that the black matrix is widen only at the intersection position of gate line 810 and the data line 820 in the purpose of shielding the thin film transistor 200 and the infrared light detector 300, and thus the aperture ratio of the pixel unit is ensured.

According to the embodiments of the present disclosure, the materials of the gate electrode 210, the gate insulating layer 220, the source-drain electrode layer 230, the active layer 240, the passivation layer 400 and the pixel electrode 500 are not limited, and may be selected according to a use requirement and a structural design of the display substrate, which will not be described here for simplicity.

According to the embodiments of the present disclosure, the display substrate for example further comprises a capacitive touch structure; in this way, the display substrate implements near control or touch control while having the remote control function. According to the embodiments of the present disclosure, an arrangement mode of the capacitive touch structure is not limited.

According to the embodiments of the present disclosure, the display substrate is provided thereon with the plurality of infrared light detectors, the plurality of infrared light detectors receive the infrared light signal remotely emitted by the stylus controlled by the user, and then convert the infrared light signal into the photocurrent signal, so that the irradiation position of the infrared light signal on the display substrate is determined, and further, the remote touch function with the distance of 1 m to 5 m is implemented; in addition, the infrared light detector and the TFT are provided on the same side of the display substrate in the same layer, which does not increase the thickness of the display substrate, and facilitates the design of light and thin display substrate.

Figure 10:
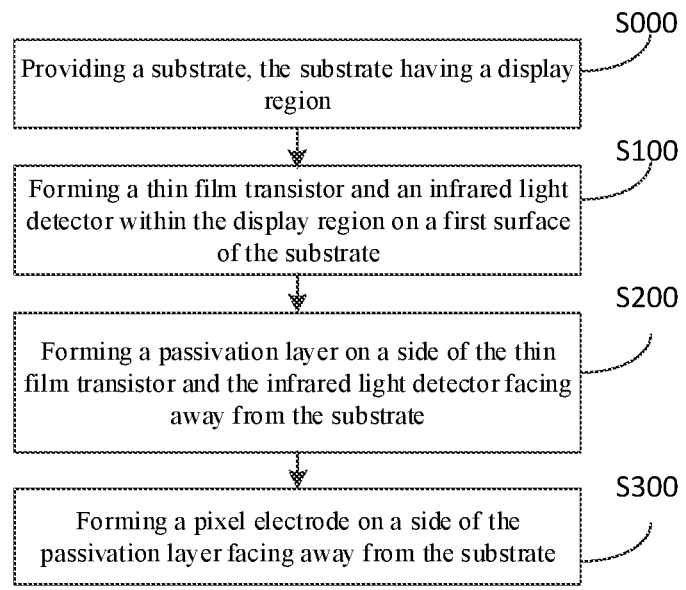
FIG. 10 is a schematic flow chart of the fabrication method of the display substrate according to the embodiments of the present disclosure.

According to the embodiments of the present disclosure, a fabrication method of a display substrate is further provided. With reference to FIG. 10, the method according to the embodiments of the present disclosure comprises:

S000: providing a substrate, the substrate having a display region.

S100: forming a plurality of infrared light detectors, the plurality of infrared light detectors being provided on a first surface of the substrate and located within the display region of the substrate.

In the step, the plurality of infrared light detectors 300 are formed on the first surface of the substrate 100. For a structure obtained in the step, FIG. 12 may be referred to. The plurality of infrared light detectors 300 are configured to receive an infrared light signal irradiated onto the display substrate and convert the infrared light signal into a current signal; and an irradiation position of the infrared light signal on the display substrate is determined according to the current signal.

In some embodiments of the present disclosure, the step S100 for example further includes forming a thin film transistor (TFT) 200 within the display region on the first surface of the substrate 100. The TFT 200 includes a gate electrode 210, a gate insulating layer 220, an active layer 240 and a source-drain electrode layer 230, and the source-drain electrode layer 230 includes a source electrode and a drain electrode. According to the embodiments of the present disclosure, the methods for forming the TFT 200 are not limited.

Figure 6:
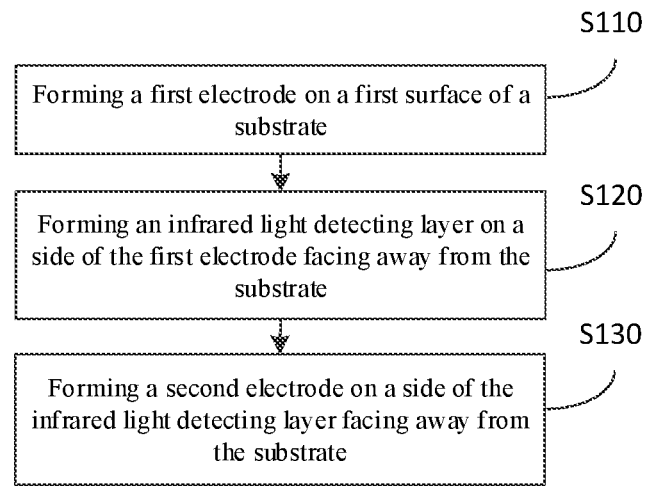
FIG. 6 is a schematic flow chart of a step S100 of a fabrication method of a display substrate according to the embodiments of the present disclosure.

According to the embodiments of the present disclosure, the methods for forming the infrared light detector 300 are not limited. In some embodiments of the present disclosure, with reference to FIG. 6, the forming the infrared light detector 300 for example includes:

S110: forming a first electrode on the first surface of the substrate.

Figure 7:
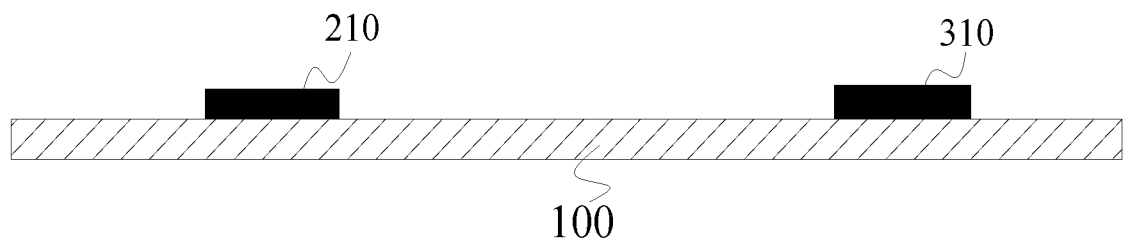
FIG. 7 is a structural schematic view after a step S110 of the fabrication method of the display substrate according to the embodiments of the present disclosure is completed.

In the step, the first electrode 310 is formed on the first surface of the substrate 100, so that an electrode of the infrared light detector 300 extending in a Y direction is obtained. In some embodiments of the present disclosure, the first electrode 310 and the gate electrode 210 are forming by a single patterning process. The first electrode 310 and the gate electrode 210 are formed by a single patterning process on the first surface of the substrate 100, and for a structure obtained in the step, FIG. 7 may be referred to. In this way, on a basis of fabricating the TFT, it is not necessary to additionally increase fabrication steps and costs of the first electrode 310 of the infrared light detector 300.

According to the embodiments of the present disclosure, methods for forming the first electrode 310 and the gate electrode 210 are not limited. For example, firstly, a gate electrode film is formed on the first surface of the substrate 100 by sputtering, and then the first electrode 310 and the gate electrode 210 are formed by a patterning process such as photolithography.

Figure 8:
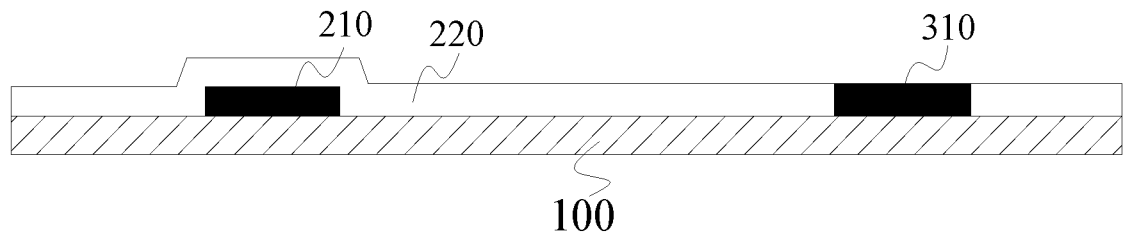
FIG. 8 is another structural schematic view after the step S110 of the fabrication method of the display substrate according to the embodiments of the present disclosure is completed.

In some embodiments of the present disclosure, with reference to FIG. 8, the gate insulating layer 220 covering the substrate 100, the gate electrode 210 and the first electrode 310 is further formed, and a portion of the gate insulating layer 220 located on a surface of the first electrode 310 is etched away. In this way, the structure shown in FIG. 8 is obtained. According to the embodiments of the present disclosure, the methods for forming and etching the gate insulating layer 220 are not limited.

S120: forming an infrared light detecting layer on a side of the first electrode facing away from the substrate.

In the step, the infrared light detecting layer 320 is formed on the side of the first electrode 310 facing away from the substrate 100; and in this way, the infrared light detecting layer 320 is directly electrically connected with the first electrode 310.

According to the embodiments of the present disclosure, a method for forming the infrared light detecting layer 320 is not limited. In some embodiments of the present disclosure, the infrared light detecting layer 320 is made of lead sulfide (PbS). For example, a photoresist layer having a hollow region is formed on a side of the gate insulating layer 220 facing away from the substrate 100, the hollow region of the photoresist layer corresponds to a region where the infrared light detecting layer 320 is to be formed, then a lead sulfide film is coated, and finally, the photoresist layer and the portion of the lead sulfide film located thereon are stripped, and an unstripped portion of the lead sulfide film forms the infrared light detecting layer 320.

Figure 9:
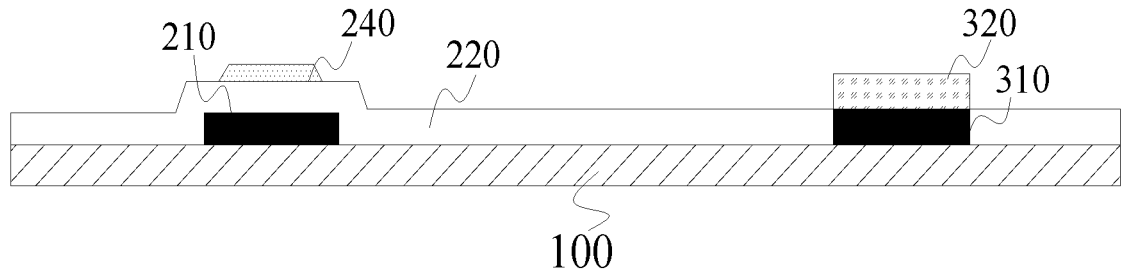
FIG. 9 is a structural schematic view after a step S120 of the fabrication method of the display substrate according to the embodiments of the present disclosure is completed.

In some embodiments of the present disclosure, the active layer 240 is formed on the side of the gate insulating layer 220 facing away from the gate electrode 210. According to the embodiments of the present disclosure, an order of forming the infrared light detecting layer 320 and the active layer 240 is not limited; the active layer 240 may be formed before the infrared light detecting layer 320 is formed, or the active layer 240 may be formed after the infrared light detecting layer 320 is formed. For a structure obtained after the step, FIG. 9 may be referred to.

S130: forming a second electrode on a side of the infrared light detecting layer facing away from the substrate.

In the step, the second electrode 330 is formed on the side of the infrared light detecting layer 320 facing away from the substrate 100, and thus, an electrode of the infrared light detector 300 extending in an X direction is obtained. In some embodiments of the present disclosure, the second electrode 330 and the source-drain electrode layer 230 are formed by using a single patterning process. On the side of the gate insulating layer 220, the active layer 240 and the infrared light detecting layer 320 facing away from the substrate 100, the source-drain electrode layer 230 and the second electrode 330 are formed by using a single patterning process; and for a structure obtained after the step, FIG. 2 may be referred to. In this way, on a basis of fabricating the TFT, it is not necessary to additionally increase fabrication steps and costs of the second electrode 330 of the infrared light detector 300.

According to the embodiments of the present disclosure, methods for forming the second electrode 330 and the source-drain electrode layer 230 are not limited. For example, a source-drain electrode thin film is formed by sputtering on the side of the active layer 240, the gate insulating layer 220 and the second electrode 330 facing away from the substrate 100; and then the source-drain electrode layer 230 and the second electrode 330 are formed by using a patterning process such as photolithography.

According to the embodiments of the present disclosure, the fabrication method further comprises: in step S110, forming a gate line 810 within the display region of the first surface of the substrate 100; and in step S130, forming a data line 820 within the display region of the first surface of the substrate 100. The gate line 810 and the data line 820 intersects with each other to define a pixel unit 800, the thin film transistor 200 is located in the pixel unit 800, the gate electrode of the thin film transistor 200 is connected with the gate line 810, and the source electrode of the thin film transistor 800 is connected with the data line 820; an extension direction of the first electrode 310 is the same as an extension direction of the gate line 810; the first electrode 310, the gate electrode of the thin film transistor 200 and the gate line 810 are formed by using a single patterning process; an extension direction of the second electrode 330 is the same as an extension direction of the data line 820; and the second electrode 330, the source electrode and the drain electrode of the thin film transistor 200, and the data line 820 are formed by using a single patterning process.

In some embodiments of the present disclosure, with reference to FIG. 10, the fabrication method for example further comprises:

S200: forming a passivation layer on a side of the thin film transistor and the infrared light detector facing away from the substrate.

In the step, the passivation layer 400 is formed on a side of the source-drain electrode layer 230, the active layer 240 and the gate insulating layer 220 of the thin film transistor 200, and the second electrode 330 of the infrared light detector 300 facing away from the substrate. In this way, the passivation layer 400 not only protects the TFT 200, but also protects the infrared light detector 300.

According to the embodiments of the present disclosure, a method for forming the passivation layer 400 is not limited.

According to the embodiments of the present disclosure, a via hole is formed in the passivation layer 400, and the via hole is used for connecting the drain electrode with a pixel electrode. For a structure obtained in the step, FIG. 4 may be referred to.

S300: forming a pixel electrode on a side of the passivation layer facing away from the substrate.

In the step, the pixel electrode 500 is formed on the side of the passivation layer 400 facing away from the substrate 100; in this way, the display substrate with a more complete function is obtained, and for a structure obtained in the step, FIG. 5 may be referred to.

According to the embodiments of the present disclosure, a method for forming the pixel electrode 500 is not limited.

In some embodiments of the present disclosure, the fabrication method of the display substrate for example further comprises forming a capacitive touch structure; in this way, the display substrate simultaneously having a remote control function and a near control or touch control function is obtained. According to the embodiments of the present disclosure, a method for forming the capacitive touch structure is not limited.

By using the fabrication method of the display substrate according to the embodiments of the present disclosure, the display substrate provided with the infrared light detector is obtained, and the display substrate has a remote control function, that is, the display substrate is capable of being remotely operated (with a distance of 1 m to 5 m from the user to the display substrate).

According to the embodiments of the present disclosure, a display panel is further provided, and the display panel comprises the display substrate as described above.

According to the embodiments of the present disclosure, types of the display panel are not limited. For example, the first surface of the substrate 100 is a surface facing the user viewing the display panel.

It should also be noted that, the display panel further has other necessary structures or components in addition to the display substrate. With a quantum dot display panel as an example, for example, the display panel further comprises a signal receiving processor, an electron transport layer, a quantum dot light emitting layer, a hole transport layer, a hole injection layer or an anode layer, and the like. With a liquid crystal display panel as an example, the display panel further comprises an opposite substrate provided opposite to the display substrate.

The display panel according to the embodiments of the present disclosure has the plurality of infrared light detectors provided on the display substrate, so that the irradiation position of the infrared light on the display substrate is determined, and further, a remote control function for operating the display panel by the user at the distance of 1 in to 5 m is implemented.

The embodiments of the present disclosure further provide a display system. According to the embodiments of the present disclosure, the display system comprises: the above-described display panel; and a stylus, which emits the infrared light signal.

According to the embodiments of the present disclosure, types of the display system are not limited.

According to the embodiments of the present disclosure, a wavelength of the infrared light signal emitted by the stylus is not limited. For example, the infrared light signal emitted by the stylus has a wavelength of 980 nm to 1500 nm. In some embodiments of the present disclosure, the infrared light signal emitted by the stylus has a wavelength of 980 nm or 1400 nm, the infrared light detecting layer made of a lead sulfide semiconductor material has very high sensitivity to infrared light with the wavelength of 980 nm or 1400 nm, and has a high photoelectric conversion rate as well.

For example, the display system comprises other necessary parts in addition to the display panel and the stylus. With a quantum dot display as an example, the display system further comprises, for example, a power line, a signal line, or a remote controller.

In the display system according to the embodiments of the present disclosure, the stylus emits the infrared light to the display panel, and by determining the irradiation position of the infrared light, a remote control function is implemented for a user at a distance of 1 m in to 5 m.

The foregoing embodiments merely are exemplary embodiments of the present disclosure, and not intended to define the scope of the present disclosure, and the scope of the present disclosure is determined by the appended claims.

The invention claimed is:

1. A display substrate, comprising:
    a substrate, having a display region; and
    a plurality of infrared light detectors, provided on a first surface of the substrate and located within the display region of the substrate, wherein,
    the plurality of infrared light detectors are configured to receive an infrared light signal irradiated onto the display substrate and convert the infrared light signal into a current signal; and an irradiation position of the infrared light signal on the display substrate is determined according to the current signal;
    each of the plurality of infrared light detectors includes: a first electrode and a second electroder provided on the substrate in a stack manner and an infrared light detecting layer, provided between the first electrode and the second electrode;
    the plurality of infrared light detectors are arranged in a plurality of rows and a plurality of columns, the first electrodes in each column are electrically connected with each other through a first lead, and the second electrodes in each row are electrically connected with each other through a second lead;
    in a row direction, a width of the first lead is smaller than a width of the first electrode; and
    in a column direction, a width of the second lead is smaller than a width of the second electrode.

2. The display substrate according to claim 1, wherein, the infrared light detecting layer includes a lead sulfide particle, and the lead sulfide particle has a size of 8 nm to 15 nm.

3. The display substrate according to claim 1, further comprising a thin film transistor, provided on the first surface of the substrate and located within the display region of the substrate, wherein,
    the first electrode and a gate electrode of the thin film transistor are made of a same material and provided in a same layer; and
    the second electrode and a source electrode and a drain electrode of the thin film transistor are made of a same material and provided in a same layer.

4. The display substrate according to claim 3, further comprising: a gate line and a data line provided within the display region of the substrate, and a pixel unit defined by the gate line and the data line intersecting with each other, wherein,
    the thin film transistor is located in the pixel unit, the gate electrode of the thin film transistor is connected with the gate line, and the source electrode of the thin film transistor is connected with the data line;
    an extension direction of the first electrode is the same as an extension direction of the gate line; and the first electrode, the gate electrode of the thin film transistor and the gate line are made of the same material and provided in the same layer; and
    an extension direction of the second electrode is the same as an extension direction of the data line; and the second electrode, the source electrode and the drain electrode of the thin film transistor and the data line are made of the same material and provided in the same layer.

5. The display substrate according to claim 3, further comprising a pixel electrode, connected with the drain electrode of the thin film transistor, wherein,
    in a direction perpendicular to the substrate, the pixel electrode does not overlap with the plurality of infrared light detectors.

6. The display substrate according to claim 3, further comprising a passivation layer, covering the plurality of infrared light detectors and the thin film transistor.

7. The display substrate according to claim 1, wherein,
    in a direction perpendicular to an extension direction of the first electrode, a width of the infrared light detecting layer is larger than or equal to a width of the first electrode; and
    in a direction perpendicular to an extension direction of the second electrode, the width of the infrared light detecting layer is larger than or equal to a width of the second electrode.

8. A fabrication method of a display substrate, comprising:
    providing a substrate, the substrate having a display region; and
    forming a plurality of infrared light detectors, the plurality of infrared light detectors being provided on a first surface of the substrate and located within the display region of the substrate, wherein,
    the plurality of infrared light detectors are configured to receive an infrared light signal irradiated onto the display substrate and convert the infrared light signal into a current signal; and an irradiation position of infrared light on the display substrate is determined according to the current signal;

each of the plurality of infrared light detectors includes: a first electrode and a second electrode, provided on the substrate in a stack manner; and an infrared light detecting, layer, provided between the first electrode and the second electrode;

the plurality of infrared light detectors are arranged in a plurality of rows and a plurality of columns, the first electrodes n each column are electrically connected with each other through a first lead, and the second electrodes in each row are electrically connected with each other through a second lead;

in a row direction, a width of the first lead is smaller than a width of the first electrode; and in a column direction, a width of the second lead is smaller than a width of the second electrode.

9. The method according to claim 8, further comprising: forming a thin film transistor, the thin film transistor being provided on the first surface of the substrate and located within the display region of the substrate, wherein, the first electrode and a gate electrode of the thin film transistor are formed by using a single patterning process; and the second electrode and a source electrode and a drain electrode of the thin film transistor are formed by using a single patterning process.

10. The method according to claim 9, further comprising: forming a gate line and a data line within the display region of the substrate, the gate line and the data line intersecting with each other to define a pixel unit, wherein, the thin film transistor is located in the pixel unit, the gate electrode of the thin film transistor is connected with the gate line, and the source electrode of the thin film transistor is connected with the data line;

an extension direction of the first electrode is the same as an extension direction of the gate line; and the first electrode, the gate electrode of the thin film transistor and the gate line are formed by using the single patterning process; and an extension direction of the second electrode is the same as an extension direction of the data line; and the second electrode, the source electrode and the drain electrode of the thin film transistor and the data line are formed by using the single patterning process.

11. A display panel, comprising the display substrate according to claim 1.

12. The display panel according to claim 11, wherein, the first surface of the substrate is a surface facing a user viewing the display panel.

13. A display system, comprising: the display panel according to claim 11; and a stylus that emits the infrared light signal.

* * * * *

UNITED STATES PATENT AND TRADEMARK OFFICE
CERTIFICATE OF CORRECTION

PATENT NO. : 10,719,154 B2  
APPLICATION NO. : 16/034934  
DATED : July 21, 2020  
INVENTOR(S) : Na Zhao, Liyun Deng and Miao Yuan Page 1 of 1

It is certified that error appears in the above-identified patent and that said Letters Patent is hereby corrected as shown below:

On the Title Page

Item (73) the Second Assignee:  
HEFEI BOE OPTOELECTRONICS TECHNOLOGY CO., LTD, Hefei (CN)

Is changed to:  
HEFEI BOE OPTOELECTRONICS TECHNOLOGY CO., LTD., Hefei (CN)

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*